US009979279B2

(12) United States Patent
Soldner et al.

(10) Patent No.: US 9,979,279 B2
(45) Date of Patent: May 22, 2018

(54) DC-DC CONVERTER INPUT VOLTAGE HIGH-ENERGY TRANSIENT CLAMPING TOPOLOGY

(71) Applicant: SENSATA TECHNOLOGIES, INC., Attleboro, MA (US)

(72) Inventors: Kirk Randall Soldner, Arden Hills, MN (US); Gary Neil Johnson, White Bear Lake, MN (US)

(73) Assignee: Sensata Technologies, Inc., Attleboro, MA (US)

( * ) Notice: Subject to any disclaimer, the term of this patent is extended or adjusted under 35 U.S.C. 154(b) by 0 days. days.

(21) Appl. No.: 15/169,951

(22) Filed: Jun. 1, 2016

(65) Prior Publication Data

US 2017/0353104 A1    Dec. 7, 2017

(51) Int. Cl.
*H02M 3/335* (2006.01)
*H02M 1/44* (2007.01)
*H02M 3/22* (2006.01)

(52) U.S. Cl.
CPC .............. *H02M 1/44* (2013.01); *H02M 3/22* (2013.01); *H02M 3/335* (2013.01); *H02M 3/33592* (2013.01)

(58) Field of Classification Search
CPC ... H02M 2001/0003; H02M 2001/322; H02M 2001/325; H02M 1/32; H02M 3/156; H02M 3/158; H02M 3/1582; H02M 3/1584; H02M 3/1588; H02M 3/335; H02M 3/33507; H02M 3/33592; H02M 3/33576; H02M 3/33569; H02M 3/337; H02H 7/10; H02H 7/12; H02H 7/1213; H02H 7/125
See application file for complete search history.

(56) References Cited

U.S. PATENT DOCUMENTS

| | | | |
|---|---|---|---|
| 5,148,358 A * | 9/1992 | Estes, Jr. | H02M 1/34 323/351 |
| 5,519,564 A | 5/1996 | Carpenter, Jr. | |
| 6,314,002 B1 | 11/2001 | Qian et al. | |
| 8,503,201 B2 | 8/2013 | Reilly | |
| 9,219,420 B1 * | 12/2015 | Zhang | H02M 3/33507 |
| 9,291,683 B2 * | 3/2016 | Rozman | G01R 31/40 |
| 9,350,259 B2 * | 5/2016 | Ou | H02M 3/33592 |
| 9,391,532 B2 * | 7/2016 | Reiter | H02M 3/3376 |

* cited by examiner

*Primary Examiner* — Emily P Pham
*Assistant Examiner* — Shahzeb K Ahmad
(74) *Attorney, Agent, or Firm* — Burns & Levinson LLP; Joseph M. Maraia; George N. Chacias

(57) ABSTRACT

In electrical systems with DC-DC converters having synchronous rectification (SR) on the output stage, the input voltage can be monitored. When a potentially destructive transient occurs, the SR is rapidly turned on in a non-synchronous manner to "crowbar" the main power transformer. The resulting short circuit is reflected back to the DC input under current-limited pulse width modulation (PWM) control. In effect, the entire surge rating of the power train is applied to the potentially destructive input transient. The clamping capacity can be controlled accurately and is significantly more than what is available in prior art components and systems. When the input voltage is pulled down to safe levels, the clamp circuit disengages and the DC-DC converter returns to normal operation. DC output voltage regulation to the connected load is not maintained during this clamping event, but maintaining output voltage regulation during such destructive transients is not required.

11 Claims, 5 Drawing Sheets

DC-DC CONVERTER INPUT VOLTAGE HIGH-ENERGY TRANSIENT CLAMPING TOPOLOGY

BACKGROUND OF THE INVENTION

1. Field of the Invention

The subject disclosure relates to methods and systems for clamping high-energy transients in applications such as battery-based systems.

2. Background of the Related Art

As is well-known, electrical components and systems can be subject to damage when subjected to excessive voltage and/or current transients. Even though components and circuits typically have some design margin and various efforts have been made at dealing with transients, damage still often occurs. One area with particular problems in dealing with transients is automotive applications and, in particular, electric vehicles. Evolving battery-based system applications of DC-DC converters and other DC loads can include destructive input voltage transients having very high energy. The traditional transient clamping techniques of metal oxide varistor (MOV), diode-based transient suppressors, and spark gaps provide protection that is limited.

One example of transient clamping is shown in U.S. Pat. No. 8,503,201 issued to Reilly on Aug. 6, 2013. Another example of transient clamping is shown in U.S. Pat. No. 6,314,002 issued to Qian et al. on Nov. 6, 2001. Still another example is the surge arrester of U.S. Pat. No. 5,519,564 issued to Carpenter, Jr. on May 21, 1996.

SUMMARY

In a high-energy DC voltage bus application, high reliability, tight performance specifications, and low cost are desirable qualities.

In one embodiment, the present disclosure is directed to electrical systems with DC-DC converters having synchronous rectification (SR) on the output stage. By monitoring the input voltage, when a potentially destructive transient occurs, the SR is rapidly turned on in a non-synchronous manner to "crowbar" or "short circuit" the main power transformer. The resulting short circuit is reflected back to the DC input under current-limited pulse width modulation (PWM) control. In effect, the entire surge rating of the power train may be applied to the potentially destructive input transient. The amount of available clamping capacity from a power train is much greater than what individual components can provide and can be tuned for a particular application. For example, for a DC-DC converter having an output power rating of approximately 3200 W, the input clamping energy can be programmed to be approximately 2100 Joules or more. This clamping capacity can be controlled accurately and is twenty to thirty times more than what a typical MOV can provide. A variety of conditions may create a transient that should be clamped to a safe level. For example, a component may fail or a main contact on a battery (e.g., 48V bus) may disconnect due to a sensor reading.

When the input voltage is pulled down to safe levels, the clamp circuit automatically disengages and the DC-DC converter returns to normal operation. DC output voltage regulation to the connected load is not maintained during this clamping event, but maintaining output voltage regulation during such destructive transients is not required. The result is the prevention of unrecoverable hardware damage to the unit itself as well as other hardware connected to the input and output DC busses. The cost savings and improved performance is significant. Additionally, the subject technology has dramatically higher reliability and dramatically lower cost than alternative clamping methods. Further, the subject technology is scalable for essentially any required rating.

It should be appreciated that the subject technology can be implemented and utilized in numerous ways, including without limitation as an all hardware embodiment, a process, an apparatus, a system, a device, a method for applications now known and later developed such as a computer readable medium, a hardware device specifically designed to accomplish the features and functions of the subject technology, as a retrofit to existing systems and combinations thereof. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

Figure 1:
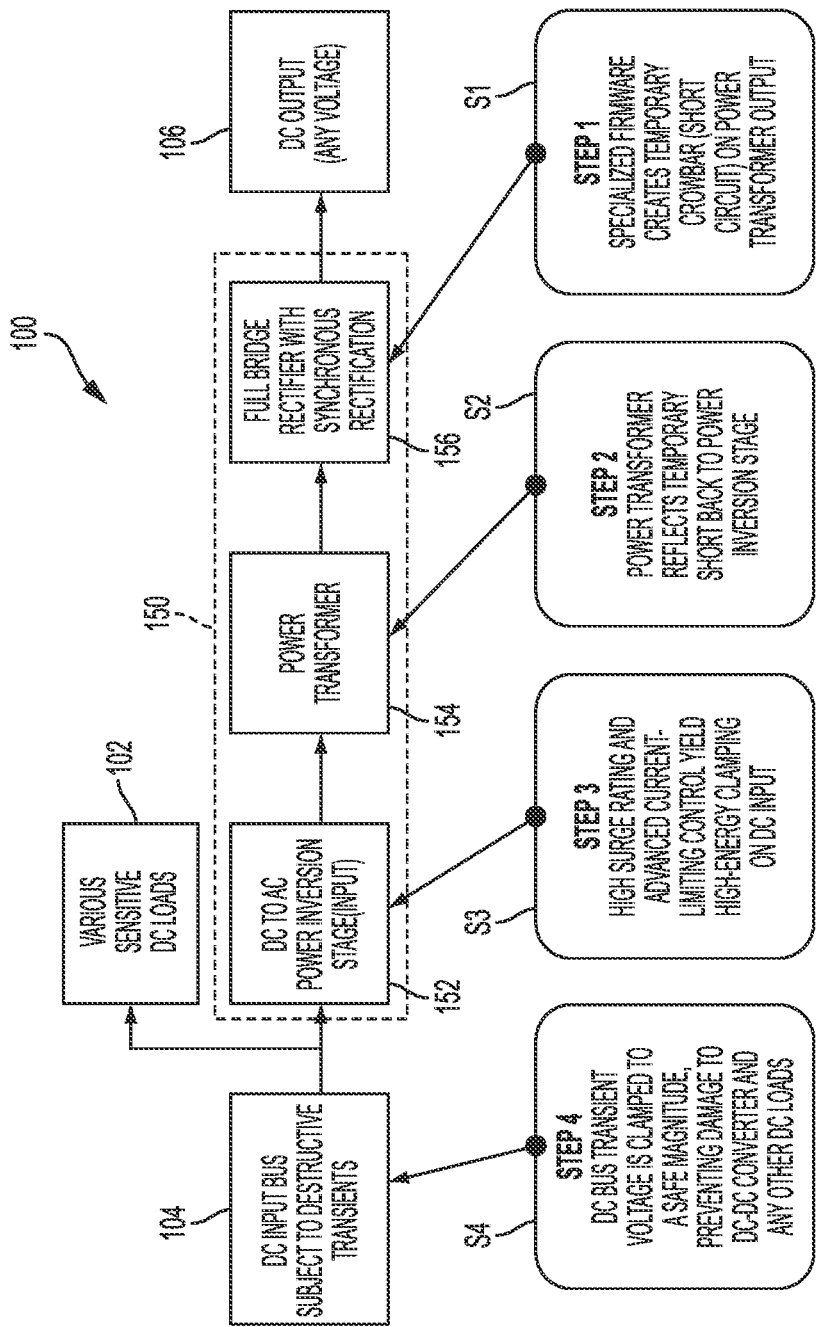
FIG. 1 is a block diagram representation of a clamping topology in accordance with the subject disclosure.

The subject technology overcomes many of the prior art problems associated with transients in electrical systems. The advantages, and other features of the systems and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements. It is understood that references to the figures such as up, down, upward, downward, left, and right are with respect to the figures and not meant in a limiting sense.

Referring now to FIG. 1, a block diagram representation of a clamping topology 100 in accordance with the subject disclosure is shown. The topology 100 protects various sensitive DC loads 102 being powered by a DC input bus 104, which may be subject to destructive transients. The topology 100 produces a DC output voltage 106 of any desired voltage. The subject technology clamps transients in order to protect components in and connected to the topology 100. The topology 100 includes an isolated DC-DC converter power train 150 for converting the output of the DC input bus 104 (e.g., 48V) to a desired DC output 106 (e.g., 12V). The DC-DC converter power train 150 includes a drive stage 152 connected to the DC input bus 104. A power transformer 154 is connected between the drive stage 152 and an output stage 156 with a full bridge rectifier that utilizes synchronous rectification. In one embodiment, the output stage 156 employs synchronous rectification via power MOSFETs. The power transformer 154 effectively couples current from one side to the other. Temporary reconfiguration of the output stage 156 can create a short circuit that is reflected back to the left side of the power transformer 154 associated with the input voltages that may have destructive amplitudes. This reflected short circuit is somewhat "softened" and controlled by pulse width modulation (PWM) techniques.

In brief overview, when the intentional short circuit is created, the input impedance of the DC-DC converter power train 150 is dramatically lower. As a result, system-related transient energy is given a temporary dissipation path through this low impedance so that the resulting voltage amplitudes are dramatically less than they would have been under "passive" system conditions (i.e., dynamic clamping occurs). This dynamic clamping provided by the DC-DC converter power train 150 under such conditions not only prevents damage to the DC-DC converter power train 150 itself, but also prevents damage to other equipment (e.g., the sensitive DC loads 102) connected to the DC input bus 104.

Still referring to FIG. 1, one embodiment of the subject technology includes a method that starts by providing an instruction set in memory of the DC-DC converter power train 150. As a result, the DC-DC converter power train 150 can selectively create a temporary short circuit (i.e., crowbar) on the output of the power transformer 154 as designated by step S1. At step S2, the power transformer 154 reflects the temporary short back to the drive stage 152. The drive stage 152 has a high surge rating and current-limiting control so that high-energy clamping is provided on the DC input at step S3. Thus at step S4, the possible destructive transients of the DC input bus 104 are also clamped to a safe magnitude to prevent damage to not only the DC loads 102 but the DC-DC converter power train 150.

The flow charts herein illustrate the structure or the logic of the present technology, possibly as embodied entirely in hardware logic, an instruction set in an application specific digital processor, and combinations thereof. Those skilled in the art will appreciate that the flow charts illustrate the structures of logical elements, including logic circuits on an integrated circuit and/or software modules, that function according to the present technology. As such, the present technology may be practiced by a machine component that renders the program code elements in a purely hardware form or a combination software and hardware that instructs a digital processing apparatus (e.g., computer) to perform a sequence of function steps corresponding to steps those shown in the flow charts.

Figure 2:
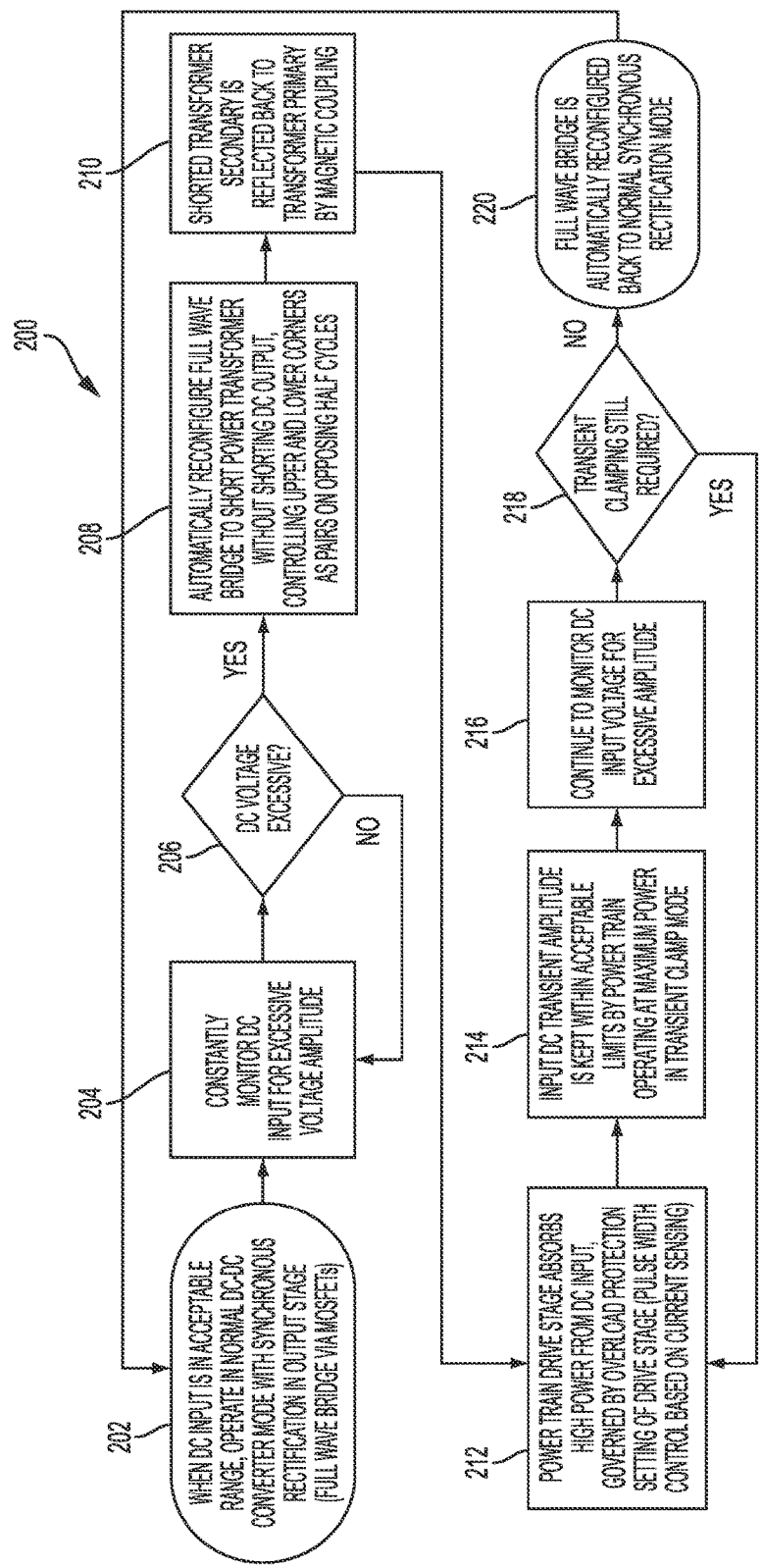
FIG. 2 is a flowchart depicting a process for clamping potentially destructive transients in an electrical system in accordance with the subject technology.

Referring now to FIG. 2, there is illustrated a flowchart 200 depicting a process for clamping potentially destructive transients in an electrical system in accordance with an embodiment of the present technology. In one embodiment, such an electrical system is the topology 100 and the following discussion applies to the topology 100. In one embodiment, the operational mode control is determined by algorithms that dynamically reconfigure the DC-DC converter power train 150 between a normal power conversion mode (also referred to as rectifier mode) and a high-energy transient clamping mode (also referred to as crowbar mode). The selection and transition between modes is preferably fully automatic (i.e., transparent to the end user) with the DC-DC converter power train 150 returning to normal power conversion mode when transient clamping is no longer required. Preferably, the configuration and components are selected so that the clamping response time is very rapid and disturbance of the DC output will be minimal. For example, the clamping response time is within the voltage rise times that result from many types of "flyback" and/or "negative step load" transients that exist in systems having some capacitance across the DC input voltage bus 104.

At step 202, the DC-DC converter power train 150 is in normal power conversion mode. For example, the DC input is in a predetermined acceptable range. Step 204 represents the consistent monitoring of the DC input for excessive amplitude (e.g., a potentially destructive transient). The monitoring may be accomplished by a controller with memory, a processor and additional peripheral devices such as sensors and the like. In another embodiment, the monitoring is performed in an all hardwired logic device assembly. The sensed readings are compared to one or more predetermined values to determine if the DC voltage is excessive. At step 206, if the DC voltage is normal (i.e., within the predetermined range), then the operation returns to step 204 for continued monitoring. If the DC voltage is excessive (i.e., outside the predetermined range), then the operation proceeds to step 208.

Figure 5:
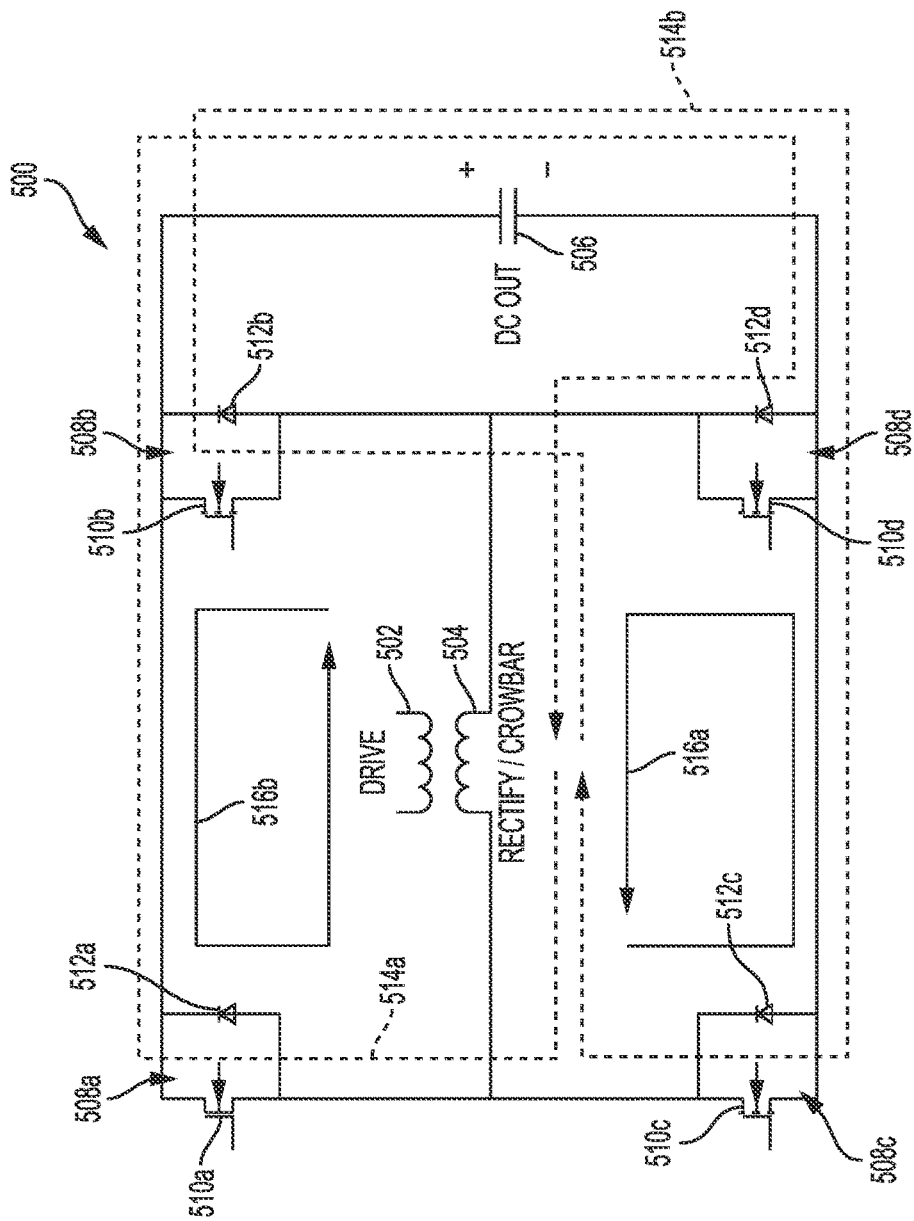
FIG. 5 is a simplified schematic for a rectifier H-bridge in accordance with the subject disclosure.

At step 208, in response to the excessive voltage, the output stage 156 is automatically reconfigured to short the power transformer 154 without shorting the DC output 106. In one embodiment, the topology 100 includes a rectifier H-bridge as shown in FIG. 5 in a simplified schematic form and described below. In step 210, the shorted power transformer secondary winding is reflected back to the transformer primary winding by magnetic coupling. At step 212, the drive stage 152 absorbs high power from the DC input, governed by the overload protection setting of the drive stage 152. The drive stage 152 has pulse width control based on current sensing.

At step 214, the input DC transient amplitude is maintained within acceptable limits by the DC-DC converter power train 150 operating up to maximum power in the high-energy transient clamping mode. At step 216, the consistent monitoring of the DC input for excessive amplitude continues. At step 218, if the DC voltage is still excessive, then the operation returns to step 212 for continued operation in the high-energy transient clamping mode. When the DC voltage becomes less than the clamping threshold, then the operation proceeds to step 220.

At step 220, the topology 100 is ready to return to normal power conversion mode. To do so, the full wave bridge is automatically reconfigured back to normal synchronous rectification operation. Then, the operation returns to step 202 and the process of flowchart 200 repeats.

Figure 3:
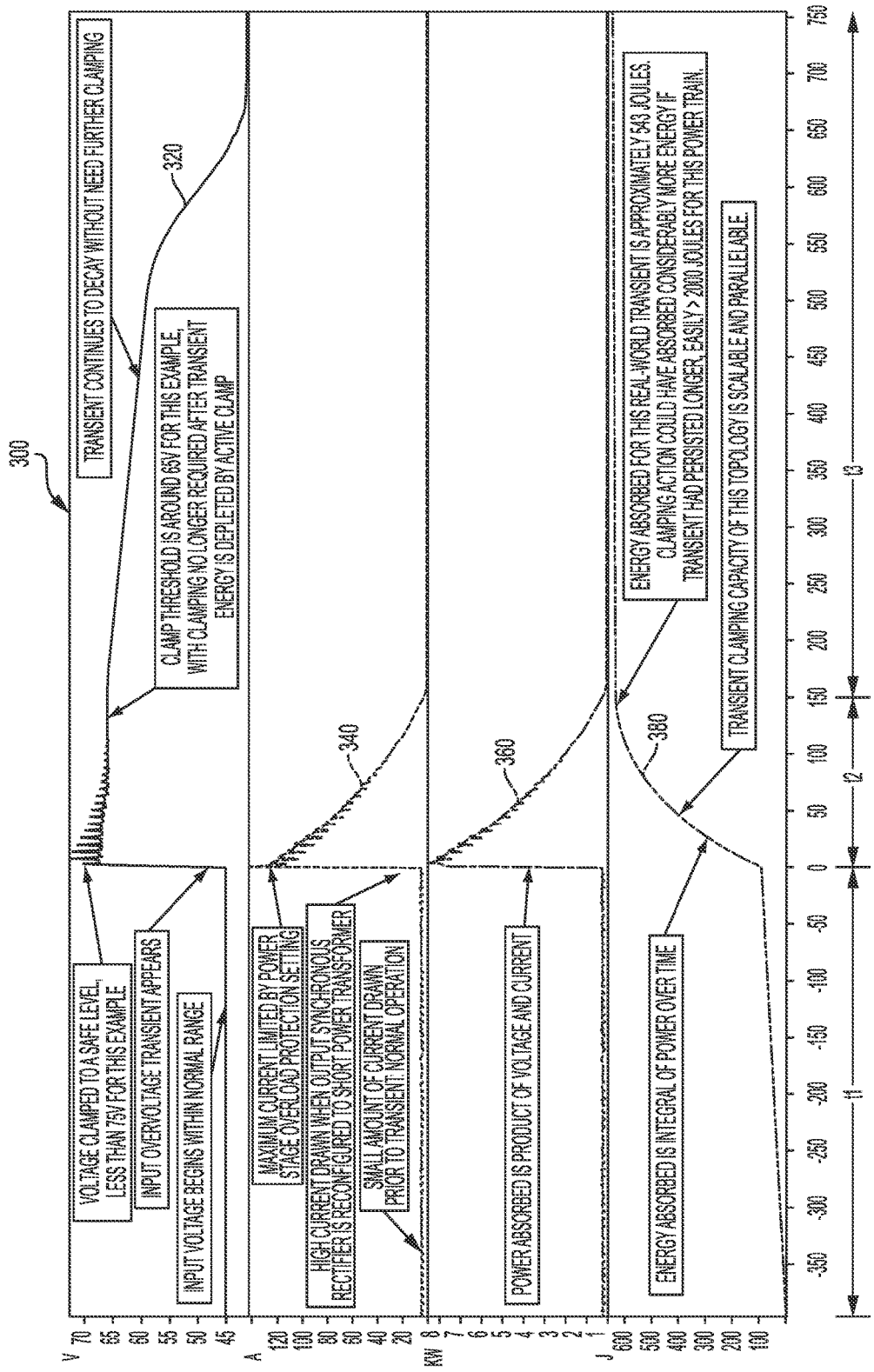
FIG. 3 is a series of synchronized waveforms illustrating operation of the subject technology.

To illustrate proper operation of the subject technology, FIG. 3 is a series 300 of synchronized waveforms 320, 340, 360, 380 in which an exemplary topology clamped a potentially destructive transient. The exemplary topology was applied to an automotive application including storage batteries, a high-output alternator, a DC-DC converter and other DC loads. The transient was created when the batteries were quickly disconnected from the DC bus (simulating failsafe protection) while the alternator was sourcing high charge current into the batteries.

As one of ordinary skill in the art would expect, the response time of the alternator was such that the alternator could not fold back the output thereof current quickly enough to prevent voltages from rising to destructive levels. In this case, the DC-DC converter switched from the normal power conversion mode to the high-energy transient clamping mode. In the high-energy transient clamping mode, DC-DC converter absorbs the necessary energy to prevent the transient from causing catastrophic damage, returning to normal power conversion mode when voltages become non-critical.

Still referring to FIG. 3, more particularly, the first waveform 320 is the input voltage (in Volts), the second waveform 340 is the input current (in Amperes), the third waveform 360 is the input power (in kiloWatts), and the fourth waveform 380 is the clamp energy (in Joules). Each waveform is on the same horizontal timescale in milliseconds.

The series 300 has a first time period t1, from approximately −400 milliseconds to 0 milliseconds, which is the normal power conversion mode. A second time period t2, from approximately 0 milliseconds to 150 milliseconds, the topology is in high-energy transient clamping mode. The series 300 also has a third time period t3, from approximately 150 milliseconds to 750 milliseconds in which the topology has returned to normal power conversion mode.

Referring to FIGS. 2 and 3, during the first time period t1 in waveform 320, the input voltage is within a normal operating range so that the process would cycle through steps 202, 204, 206. As seen in waveform 340, the input current is small during normal operation (e.g., the input current is proportional to actual DC output loading). At the end of time period t1 (approximately 0 milliseconds), an input transient appears that is excessive. For example, the input overvoltage transient may be above a predetermined threshold of 65 Volts. As a result, the method of flowchart 200 proceeds from step 206 to 208 in which the topology shifts to high-energy transient clamping mode.

During time period t2, the input voltage is clamped to a safe level (e.g., below 75V). Steps 208, 210, 212, 214 maintain the input voltage at a safe level. The input current waveform 340 and the input power waveform 360 indicate how the high current is drawn as a result of the shorted/crowbarred power transformer secondary winding. The clamped energy waveform 380 rapidly ramps up indicating the amount of energy absorbed (e.g., 543 J for this example). The subject technology can advantageously be utilized to absorb significantly more energy as well as being scalable and parallelable for various applications. As indicated by steps 216, 218, the DC input is continually monitored during time period t2 to determine if transient clamping is still required.

At approximately 150 milliseconds, the transient energy has been depleted to a safe level (e.g., below 75V) so that clamping is no longer required. Hence, the topology transitions back to the normal power conversion mode in time period t3 (step 220 of FIG. 2). Although clamping is no longer active, the transient continues to decay until approximately 675 milliseconds without risk of destruction. At such time, the transient event is over and the topology can fully return to normal operation.

Figure 4:
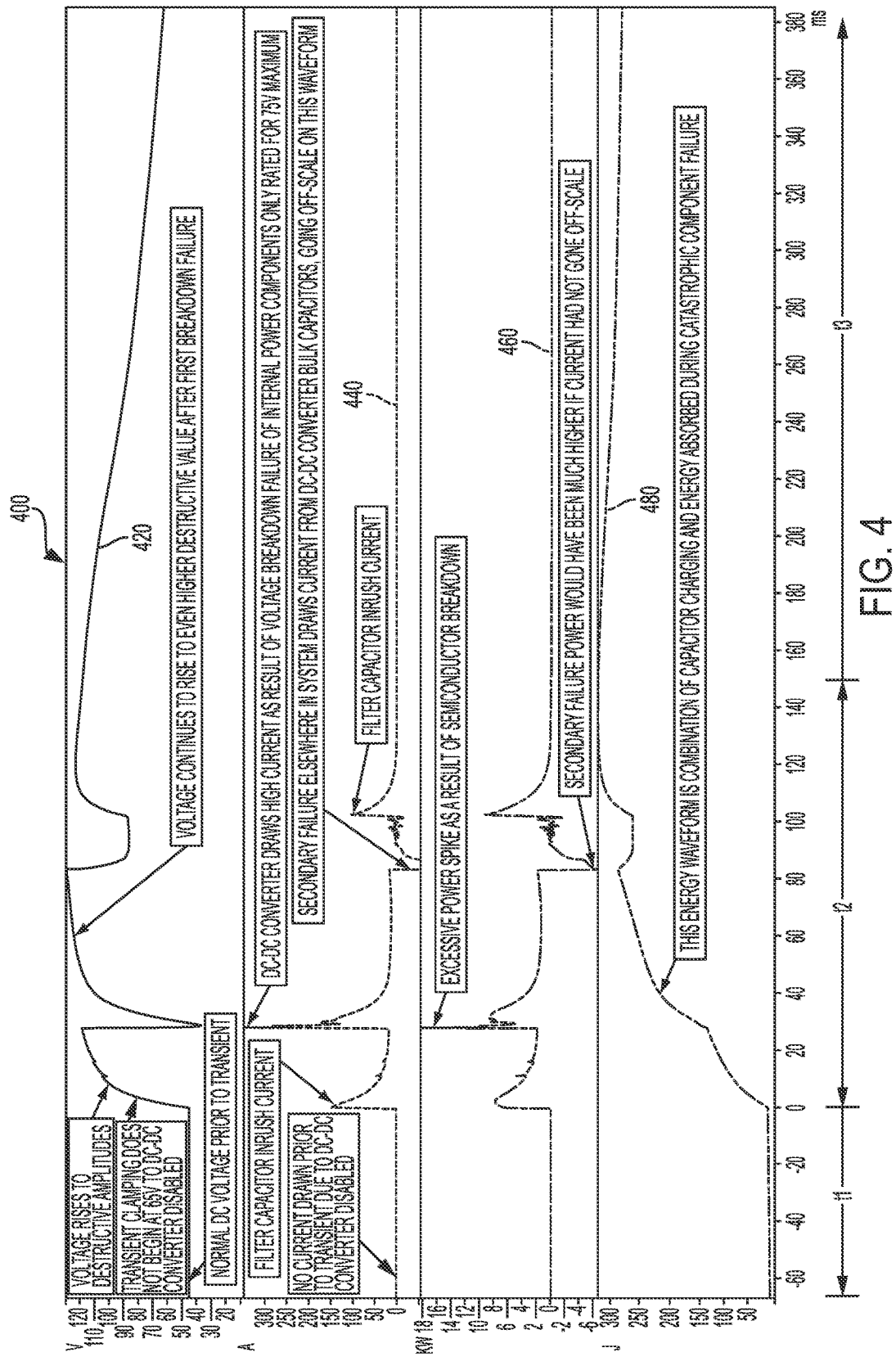
FIG. 4 is a series of synchronized waveforms illustrating an un-clamped destructive transient.

In contrast to the description of FIG. 3 above, FIG. 4 is a series 400 of synchronized waveforms 420, 440, 460, 480 in which an exemplary system had a potentially destructive transient without clamping. The waveforms 420, 440, 460, 480 are the same parameters as shown in FIG. 3 except labeled in a four hundred series to correspond to FIG. 4. The series 400 was generated by disabling the DC-DC converter under the same system conditions as the series 300 of FIG. 3.

During time period t1, normal DC input voltage is present (e.g., the input voltage waveform 420 is at approximately 48V) and no current is drawn due to the DC-DC converter being disabled (e.g., the input current waveform 440 is at 0A). At the end of time period t1 (e.g., 0 milliseconds), a transient spike occurred with the DC input voltage rising to a destructive level of over 110V. The input current waveform 440 rises due to filter capacitor inrush current and, correspondingly, the input power waveform 460 also spikes. The excessive voltage and current damages components.

At approximately 30 milliseconds, the DC-DC converter draws high current (see the input current waveform 440) as a result of the voltage breakdown failure of components only rated for a maximum of 75V. There is a corresponding dip in the input voltage waveform 420 and a corresponding spike in input power waveform 460 during the semiconductor breakdown, lasting until the subject parts burn open. The clamp energy waveform 480 rises from a combination of capacitor charging and energy absorbed by catastrophic component failure.

After the initial breakdown of components, the input voltage continues to rise over 120V causing a secondary breakdown at approximately 82 milliseconds. As can be seen from the waveforms 420, 440, 460, multiple instances of significant damage can occur due to an unclamped transient. Eventually in time period t3, the transient returns to safe levels but not before the damage has occurred.

In view of the above, it is apparent that the DC input voltage waveforms 320, 420 are dramatically different for clamped versus unclamped. In this comparison, the "negative step load" voltages from the high-output alternator were destructive, damaging not only the DC-DC converter but other system components including the high-output alternator. Such failures are extremely high-impact as a result of system downtime, hardware repair costs, and customer dissatisfaction. The subject clamp topology has been proven to be extremely effective and is practical to implement.

Referring now to FIG. 5, an embodiment for accomplishing the subject technology in a topology is shown as a simplified schematic 500 with a rectifier H-bridge. The schematic 500 includes the primary coil 502 (i.e. drive coil) and the secondary coil 504 (i.e. rectify/crowbar coil). The power inversion stage 152 for primary coil 502 is connected to the DC input 104 as shown in FIG. 1. The secondary coil 504 of the power transformer 154 is connected to the load 506 (represented as a capacitor) via the H-bridge. The H-bridge is formed by four corner switch assemblies 508a-d. In one embodiment, each switch assembly 508a-d includes one or more N-channel MOSFETs 510a-d containing integral body diodes 512a-d.

By controlling the switch assemblies 508a-d, the topology can be switched from rectifier mode to crowbar mode and vice versa. The rectifier mode is represented by two dashed line current flowpaths 514a, 514b. The crowbar mode is represented by two solid line current flowpaths 516a, 516b. At any given time, only one flowpath 514a, 514b, 516a, 516b is present.

In rectifier mode, each flowpath 514a, 514b is half the AC cycle and the corresponding active switch assemblies operate in synchronous rectification (SR) mode. For the flowpath 514a, the positive voltage is on the left side of the secondary coil 504 so that the current flows through the transformer secondary along the arrowhead from right to left and then flows into the switch assembly 508a (i.e., the SR components). Current flow continues through the load 506. Current then flows though switch assembly 508d (SR components) and continues back to the transformer secondary 504 to complete the half cycle. The current does not flow through the switch assemblies 508b, 508c because the respective MOSFETs 510b, 510c are off and associated body diodes 512b, 512c are back biased to block current flow.

The flowpath 514b represents the other half of the recitifier mode cycle. For flowpath 514b, the positive voltage is on the right side of the secondary coil 504 so that the current flows through the transformer secondary along the arrowhead from left to right and then flows into the switch assembly 508b (SR components). Current flow continues through the load 506. Current then flows through switch assembly 508c (SR components) to complete the other half of the cycle in rectifier mode. The current does not flow through the switch assemblies 508a, 508d because the respective MOSFETs 510a, 510d are off and associated body diodes 512a, 512d are back biased to block current flow.

As noted above, when the DC input voltage becomes excessive due to a dangerous current transient, the topology 100 can switch into crowbar mode by selectively activating the MOSFETs 510a-d as upper and lower pairs on opposing half cycles. In particular, current flowpath 516a represents one half of the cycle with MOSFETs 510c, 510d activated. As a result, when the secondary winding 504 has a positive voltage on the left, current flows from right to left through the secondary winding 504 as indicated by the flowpath 516a. The current then passes through MOSFETs 510c, 510d with nothing else in the circuit except wiring, which is, in effect, a short circuit. However, it is noted that the DC output is advantageously not shorted because the upper corners 508a, 508b do not conduct.

The other half of the cycle in crowbar mode is represented by current flowpath 516b with MOSFETs 510a, 510b activated. As a result, when the secondary winding 504 has a positive voltage on the right, current flows from left to right through the secondary winding 504 as indicated by the flowpath 516b. The current then passes through MOSFETs 510a, 510b with nothing else in the circuit except wiring, which is effectively another short circuit. Again, it is noted that the DC output is advantageously not shorted because the lower corners 508c, 508d do not conduct. As can be seen, by controlling the MOSFETs 510a-d, the H-bridge configuration can selectively create the crowbar mode.

It will be appreciated by those of ordinary skill in the pertinent art that the subject technology is applicable to a wide variety of applications. For example, the subject technology is useful in portable electronic devices such as laptop computers, photovoltaic systems, wind turbines, appliances, and battery circuitry such as Lithium-ion battery packs in automotive applications. The functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., stages, modules, transformers, and the like) shown as distinct for purposes of illustration may be incorporated within other functional elements in a particular implementation.

All patents, patent applications and other references disclosed herein are hereby expressly incorporated in their entireties by reference. While the subject technology has been described with respect to preferred embodiments, those skilled in the art will readily appreciate that various changes and/or modifications can be made to the subject technology without departing from the spirit or scope of the invention as defined by the appended claims.

What is claimed is:

1. An electrical system comprising:
   a DC input bus having an input; and
   a DC-DC converter power train connected to a DC output for converting the input of the DC input bus to a desired DC output, the DC-DC converter power train including: an output stage with an H-bridge rectifier having a coil, a load, a first switch assembly, a second switch assembly, a third switch assembly, and a fourth switch assembly, the H-bridge rectifier employing synchronous rectification; a drive stage connected to the DC input bus; and a power transformer connected between the drive stage and the output stage,
   wherein:
   the H-bridge is configured to operate in synchronous rectification (SR) mode when the DC input bus input is below a predetermined threshold; and
   the H-bridge is configured to switch to crowbar mode when a transient causes the DC input bus input to rise above the predetermined threshold, crowbar mode causing the transient to be reflected back while still providing a load to the DC output in accordance with the desired DC output.

2. An electrical system as recited in claim 1, wherein in crowbar mode the transient is passed back to the DC input bus under current-limited pulse width modulation (PWM) control.

3. The electrical system of claim 1 wherein in SR mode, the H-bridge is configured to operate such that:
   a positive voltage on a first side of the coil creates a current flow through the first switch assembly to the load, then through the fourth switch assembly to a second side of the coil; and the second and third switch assemblies block the current flow from passing therethrough; and
   a positive voltage on the second side of the coil creates a current flow through the second switch assembly to the load, then through the third switch assembly to the first side of the secondary coil; and the first and fourth switch assemblies block the current flow from passing therethrough.

4. The electrical system of claim 1 wherein in crowbar mode, the H-bridge is configured to operate such that:
   a positive voltage on a first side of the coil creates a current flow allowing the transient to pass through the third switch assembly, then through the fourth switch assembly to a second side of the coil to pass the transient back to the DC input bus; the first and second switch assemblies being non-conductive to allow a normal current to pass to the load to avoid short circuiting; and
   a positive voltage on the second side of the coil creates a current flow allowing the transient to pass through the second switch assembly, then through the first switch assembly to the first side of the coil to pass the transient back to the DC input bus; the third and fourth switch assemblies being non-conductive to allow a normal current to pass to the load to avoid short circuiting.

5. An electrical system comprising:
   a DC input connected to a power inversion stage with a primary coil;
   a power transformer connecting the power inversion stage to an output stage having a load, the power transformer having a secondary coil connected to the load via an H-bridge, the H-bridge including: a first switch assembly having a first MOSET and a first diode; a second switch assembly having a second MOSFET and a second diode; a third switch assembly having a third MOSFET and a third diode; and a fourth switch assembly having a fourth MOSFET and a fourth diode,
   wherein the H-bridge is configured to switch from a synchronous rectification (SR) mode to a crowbar mode when a destructive transient occurs, the SR mode allowing a current flow through the load, the crowbar mode short circuiting the destructive transient while still allowing the current flow through the load.

6. The electrical system of claim 5 further comprising a monitor configured to track an input voltage to the DC input to detect the destructive transient.

7. The electrical system of claim 6, wherein the H-bridge is configured to automatically switch to SR mode when the input voltage is below a predetermined threshold.

8. The electrical system of claim 5, wherein the H-bridge is further configured such that in crowbar mode, short circuiting the destructive transient includes sending the destructive transient back to the DC input under current-limited pulse width modulation (PWM) control.

9. An electrical system comprising:
  a DC input connected to a power inversion stage with a primary coil;
  a power transformer connecting the power inversion stage to an output stage having a load, the power transformer having a secondary coil; and
  an H-bridge connecting the secondary coil to the load including: a first switch assembly having a first MOSFET and a first diode; a second switch assembly having a second MOSFET and a second diode; a third switch assembly having a third MOSFET and a third diode; and a fourth switch assembly having a fourth MOSFET and a fourth diode,
  wherein the H-bridge is configured to switch from a synchronous rectification (SR) mode to a crowbar mode when a transient occurs, such that in crowbar mode:
    a positive voltage on a first side of the secondary coil creates a current flow allowing the transient to pass through the third switch assembly, then through the fourth switch assembly to a second side of the secondary coil; the first and second switch assemblies being non-conductive to allow a normal current to pass to the load to avoid short circuiting; and
    a positive voltage on the second side of the secondary coil creates a current flow allowing the transient to pass through the second switch assembly, then through the first switch assembly to the first side of the secondary coil; the third and fourth switch assemblies being non-conductive to allow a normal current to pass to the load to avoid short circuiting.

10. The electrical system of claim 9, wherein the H-bridge is further electrically configured such that in SR mode:
  a positive voltage on the first side of the secondary coil creates a current flow through the first switch assembly to the load, then through the fourth switch assembly to a second side of the secondary coil; and the second and third switch assemblies block the current flow from passing therethrough; and
  a positive voltage on the second side of the secondary coil creates a current flow through the second switch assembly to the load, then through the third switch assembly to the first side of the secondary coil; and the first and fourth switch assemblies block the current flow from passing therethrough.

11. The electrical system of claim 9 further comprising a monitor configured to track an input voltage in the DC input and switch the H-bridge into SR mode when the input voltage drops below a predetermined threshold.

* * * * *